April 11, 1939.  W. M. HOOSE  2,154,309
CAR LOADER
Filed March 5, 1934   2 Sheets-Sheet 1
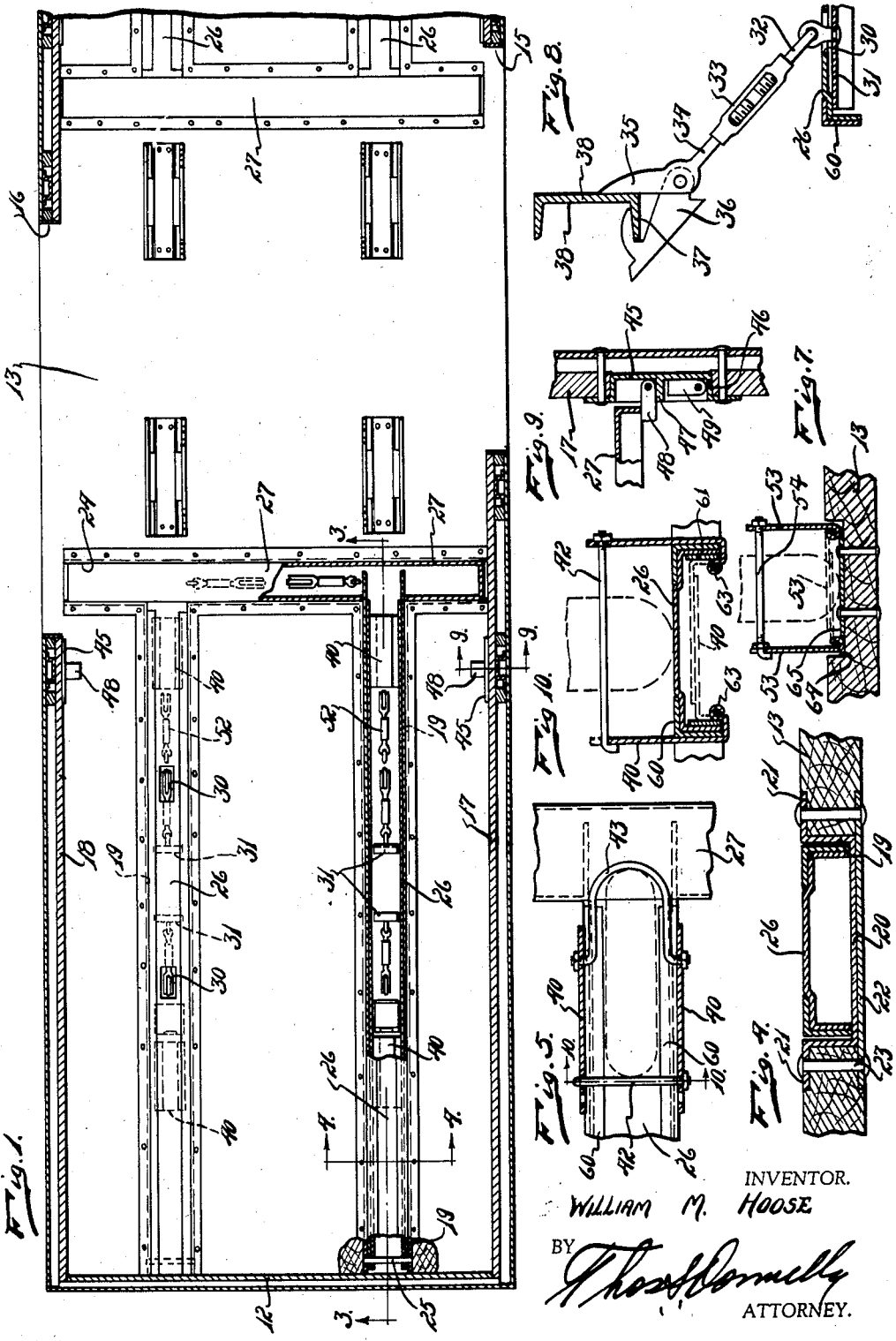
INVENTOR.
WILLIAM M. HOOSE
BY Thos H Donnelly
ATTORNEY.

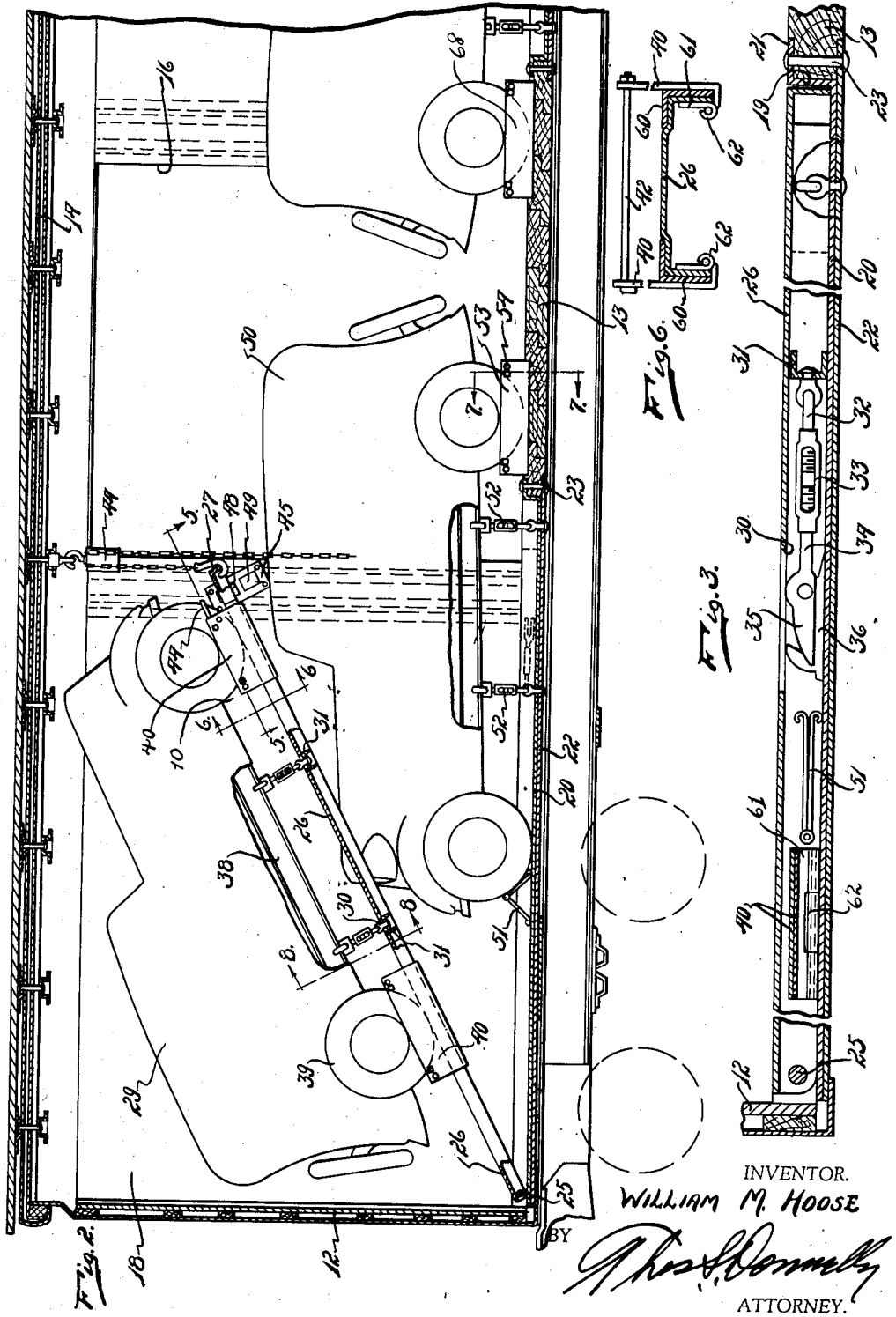

Patented Apr. 11, 1939

2,154,309

UNITED STATES PATENT OFFICE 2,154,309

CAR LOADER

William M. Hoose, Highland Park, Mich.

Application March 5, 1934, Serial No. 714,065

3 Claims. (Cl. 105—368)

My invention relates to a new and useful improvement in a carloader adapted for mounting in freight cars and similar vehicles used in transportation of large bodies, such as automobiles.

It is an object of the invention to provide a device of this class which will be simple in structure, economical of manufacture, durable, highly efficient in use, easily and quickly moved to operative and inoperative position.

Another object of the invention is the provision of a carloader of this class so arranged and constructed that when it is lowered to position for removing therefrom a vehicle mounted thereon, the device will have moved into such a position as not to form any obstruction in the car so that the car may be used for other purposes without requiring a storing away or a removal of the loading device.

Another object of the invention is the provision of a car loader of this class arranged when moved to elevated position for supporting a vehicle in inclined position, and when lowered to inoperative position to lie in a channel or groove formed in the floor of the car, and lie with its upper surface flush with the floor.

Another object of the invention is the provision in combination with a carloader of this class of a "tie down" mechanism so arranged and constructed as to be easily and quickly secured in position in attachment with the chassis of the vehicle so as to securely bind the vehicle against lateral movement when supported on the loading device.

Another object of the invention is the provision in a carloader of this class of a swingably mounted support adapted for elevation to different heights so as to accommodate vehicles having varying heights of bodies.

Other objects will appear hereinafter.

The invention consists in the combination and arrangement of parts hereinafter described and claimed.

The invention will be best understood by a reference to the accompanying drawings which form a part of this specification, and in which, Fig. 1 is a top plan view of the invention, showing it applied, with parts broken away and parts shown in section.

Fig. 2 is a fragmentary, longitudinal, sectional view through a car embodying the invention.

Fig. 3 is a fragmentary sectional view taken on line 3—3 of Fig. 1.

Fig. 4 is a sectional view taken on line 4—4 of Fig. 1.

Fig. 5 is a sectional view taken on line 5—5 of Fig. 2.

Fig. 6 is a sectional view taken on line 6—6 of Fig. 2.

Fig. 7 is a sectional view taken on line 7—7 of Fig. 2.

Fig. 8 is a sectional view taken on line 8—8 of Fig. 2.

Fig. 9 is a sectional view taken on line 9—9 of Fig. 1.

Fig. 10 is a sectional view taken on line 10—10 of Fig. 5.

In the drawings I have illustrated the invention mounted in a freight car embodying an end wall 12, a floor 13, a roof 14, door openings 15 and 16 at opposite sides, and side walls 17 and 18. Formed in the floor 13 and projecting toward the end walls from adjacent the door openings are the parallel slots 19, positioned in each of which is the channel iron 20 having the laterally turned flanges 21 at opposite edges which are secured to a plate 22 by means of rivets 23. This plate serves as a bottom for the slot 19, and the channel secured in the slot forms a groove. Each of these grooves opens into a transversely extending groove 24 which is lined in a manner similar to the slots 19. Pivoted at one end to the channel 20 adjacent the end wall 12 of the car by means of the pin 25 is an elongated strip of channel iron 26. These channel irons 26 are in spaced relation as shown clearly in Fig. 1, and they are connected by a strip 27 of channel iron which projects at its opposite ends beyond the outer sides of the channels 26. The construction is such, that when the device is swung downwardly into the position shown in Fig. 1, the channels 26 and 27 will lie in the grooves formed in the floor, and lined by the metallic lining, as clearly shown in Fig. 4, so that there will be no obstruction on the floor of the car. It is therefore obvious that when these devices are in lowered or inoperative position, the car may be used for ordinary purposes in the transportation of small commodities, and even in the transportation of grain in loose condition.

When it is desired to load a vehicle on this loader, which serves as a support for the vehicle, the device would be in inoperative position, thus lying flush with the upper surface of the floor 13. The vehicle 29 would then be placed upon the device so that the wheels would rest upon the channels 26. Formed in these channels 26 are openings 30 through which "tie downs" may be projected. The "tie down" comprises a strip 31 of channel iron to which is fastened pivotally the rod 32, threading into one end of the turn buckle 33. Threaded into the opposite end of the turn buckle 33 is the rod 34 which is angularly turned to provide the nose 35. A hook 36 is swingably mounted on the base of the nose 35 so as to hook over the lower flange 37 of the chassis rail 38. When the device is in operative position, the member 31 will span the opening 30, and the rest of the device will project outwardly therethrough. When the channel is moved to inoperative position, as shown in Fig. 1, these "tie downs" are concealed beneath the channels 26 as clearly shown in Fig. 3. At each of the wheels 39 of the vehicle, there is mounted a pair of plates 40. Reinforcing each edge of the channel 26 is an angle iron 60, and welded to the inner surface of the channel at the location of the plates 40, are plates 61 formed on which are the knuckles 62 cooperating with knuckles 63 formed on the angularly turned ends of the plates 40, and through these knuckles is mounted a pintle to swingably mount these plates 40 in position. The plates 40 may be swung when in inoperative position to lie beneath the channel 26 as shown in the dotted line position in Fig. 10. When swung to operative position in Fig. 9. these plates are connected by the bolts 42 and the U shaped bolt 43. The bolts projected through the plates 40 will serve as abutments to prevent movement of the vehicle longitudinally of the channel. After the vehicle is thus mounted, a chain block 44 or other suitable lifting mechanism is hooked to the roof of the car and the device elevated to the proper height so as to raise the vehicle to the tilted position shown in Fig. 2. As clearly appears from Fig. 2 and Fig. 4, these channel irons 26 substantially fill the groove in which they lie, and the fit of the channel members 26 in their grooves may be said to be a snug one. By having a snug fit the sides of the channels 26 will engage the sides of the grooves and resist lateral swinging of the members 26. In this way the pins 25 are relieved of lateral strain.

Mounted on the side wall of the car inwardly of the door opening is a box-like structure 45 which is set in the opening 46 and secured thereto. This box-like structure 45 carries the middle partition 47, and swingably mounted above this middle partition 47 is a keeper 48. A similar keeper 49 is swingably mounted adjacent the lower end of the structure 45. As the supporting frame is raised, the ends of the flange 27 will ride upwardly over the keepers 48 and 49. When positioned above the keeper 49, and the keeper 49 is swung downwardly, it is obvious that the supporting structure will thus be held in position. I have provided a pair of these keepers, so that the elevation of the supporting structure may be varied to accommodate the device for use with vehicles having bodies of different heights or styles.

The car 50, positioned below, may engage with a pair of its wheels in the channel lined by the member 20, and a suitable stop 51 may be secured in this channel for preventing longitudinal movement of the car thereon. Secured to the channel are suitable "tie downs" 52, constructed as already described. The rear wheels are secured between a pair of plates 53 bolted together by the bolts 54. The wheel rests upon a plate 65 which is secured in the recess 64, and the plates 53 are swingably mounted on this plate 65 so that when the plates are not needed for use, they may be swung downwardly to lie in the recess 64 as shown in the dotted line position in Fig. 7. The various "tie downs" are illustrated as being located beneath the channels 26, so that all of the mechanism used with the device is thus enclosed. The plates 68, shown in Fig. 2, are mounted in the same manner as are the plates 53 and serve the same function.

It is thus obvious that when the supporting mechanism is lowered to car unloading position, and the vehicle removed therefrom, the car 12 will be in position for normal use, as no need of storing away the various parts of the car loading structure is necessary.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In a car loading device for loading vehicles having a pair of spaced front wheels and a pair of spaced rear wheels, the combination of: a structure into which vehicles are to be loaded, and having a bottom provided with a pair of spaced, longitudinally-extending, parallel slots and connected, adjacent one of their ends, by a transversely-extending slot; a pair of supporting members, each permanently engaging at one of its ends in one of said parallel slots adjacent the end thereof and swingably mounted at said end to said bottom, said supporting members being swingable to lie in said slots and being adapted when lying therein for substantially filling the same and forming with its outer face a continuation of the upper face of the bottom; a transversely-extending connecting member connecting the free ends of said supporting members and adapted for lying in and substantially filling said transversely-extending slot and forming with its outer face a continuation of the bottom, said supporting members being swingable into elevated position at their free ends and being of sufficient length to engage simultaneously the front and rear wheels of a vehicle for supporting the same, said transversely-extending connecting member projecting at its opposite ends beyond the outer sides of said supporting member; a keeper swingably mounted on the side walls of the supporting structure and swingable into position below the projecting ends of said connecting member for retaining the same in elevated position, the fit of said supporting members in said slots being a snug one, and the sides of said members at the pivoted end engaging the sides of said slot for resisting lateral movement of said supporting members relatively to said slots.

2. In a device of the class described, a swingable channel-shaped supporting member mounted in inverted position, the side plates of said channel member projecting downwardly; and a pair of U-shaped guard plates, each pivotally connected at one of its ends to the inner side of one of said side plates and adapted for swinging into position to lie beneath said supporting member and into another position for extending upwardly from and in engagement with the outer side thereof.

3. In a device of the class described, a swingable channel-shaped supporting member mounted in inverted position, the side plates of said channel member projecting downwardly; a pair of U-shaped guard plates, each pivotally connected at one of its ends to the inner side of one of said side plates and adapted for swinging into position to lie beneath said supporting member and into another position for extending upwardly from and in engagement with the outer side thereof; and means for connecting said plates together when in upstanding position.

WILLIAM M. HOOSE.